(12) United States Patent
Elferich et al.

(10) Patent No.: US 6,829,151 B2
(45) Date of Patent: Dec. 7, 2004

(54) REGULATING DEVICE FOR A RESONANT CONVERTER

(75) Inventors: Reinhold Elferich, Aachen (DE); Thomas Duerbaum, Langerweh (DE); Hubert Raets, Landgraaf (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/234,800

(22) Filed: Sep. 4, 2002

(65) Prior Publication Data
US 2003/0067791 A1 Apr. 10, 2003

(30) Foreign Application Priority Data
Sep. 4, 2001 (DE) ......................................... 101 43 251
Oct. 4, 2001 (DE) ......................................... 101 48 932
Oct. 23, 2001 (DE) ......................................... 101 52 194

(51) Int. Cl.[7] ............................................. H02M 3/335
(52) U.S. Cl. ......................................... 363/17; 363/41
(58) Field of Search ............................. 363/16, 17, 40, 363/41, 95, 97, 131

(56) References Cited

U.S. PATENT DOCUMENTS

| | | | | |
|---|---|---|---|---|
| 3,886,436 A | * | 5/1975 | Wadlington | 323/225 |
| 4,253,137 A | * | 2/1981 | Rao | 363/21.1 |
| 4,504,895 A | * | 3/1985 | Steigerwald | 363/17 |
| 4,535,399 A | * | 8/1985 | Szepesi | 363/41 |
| 4,823,249 A | * | 4/1989 | Garcia, II | 363/48 |
| 5,159,541 A | * | 10/1992 | Jain | 363/26 |
| 5,737,203 A | * | 4/1998 | Barrett | 363/75 |
| 5,999,433 A | * | 12/1999 | Hua et al. | 363/132 |
| 6,587,359 B2 | * | 7/2003 | Raets et al. | 363/24 |
| 6,721,191 B2 | * | 4/2004 | Duerbaum et al. | 363/16 |

* cited by examiner

*Primary Examiner*—Adolf Berhane
(74) *Attorney, Agent, or Firm*—Dicran Halajian

(57) ABSTRACT

A resonant converter includes an inverter for generating an AC voltage which is fed to a resonant arrangement with a capacitor and a transformer. The circuit provides two types of secondary units, each having a secondary winding of the transformer and at least one rectifier element. Secondary units of the first and second type are then distinguished by opposite orientation. At least two output voltages are delivered on the output, a first output voltage of which being supplied as a direct output of a first-type secondary unit and a second output voltage as a "stack output" of a first-type secondary unit and a second-type secondary unit. The two output voltages can be regulated separately and independently of each other with a regulating device by suitably choosing frequency and duty cycle of a pulse width modulated voltage generated by the inverter driven by the regulating device.

15 Claims, 6 Drawing Sheets

REGULATING DEVICE FOR A RESONANT CONVERTER

The invention relates to a resonant converter, a regulation method for a resonant converter and a switched-mode power supply.

A switched converter operating as a DC voltage converter transforms an input side DC voltage into one or more output side DC voltages in that the input-side DC voltage is first chopped i.e. transformed into a switched AC voltage and with this switched AC voltage a resonant arrangement comprising at least one capacitor is fed, which capacitor comprises the primary side of a transformer. On the second side the transformer comprises one or more windings whose voltages are rectified to generate output DC voltages.

Known switched-mode power supplies comprise a power supply input circuit for connection to the electricity power grid, and a switched converter. The power supply input circuit renders an intermediate circuit DC voltage available with which the switched converter is fed. The intermediate circuit DC voltage is transformed into one or more output DC voltages by the converter.

Many circuits for switched converters are known. They are not only resonant converters but also circuits in which no resonant arrangement is used. Switched converters can be instrumental in manufacturing cost-effective small and light power supplies/switched-mode power supplies which may be used to advantage in consumer electronics such as set top boxes, satellite receivers, television sets, computer monitors, video recorders, compact audio sets and so on. For these applications are often necessary converters that generate a plurality of output voltages from one DC input voltage.

Usually, one of the output voltages is regulated to a set value. With state-of-the-art converters which produce a plurality of output voltages, with each of the output voltages being assigned a secondary winding of the transformer, a plurality of output voltages cannot be regulated independently of each other. In such circuits is provided a regulating device for only one of the output voltages. It is assumed then that the other voltages—which are linked with the one regulated voltage via the ratio of the number of windings—are "co-regulated" with the latter. However, with very different load on the individual outputs this is highly disadvantageous.

A known topology of a converter comprises the so-termed load resonant converter. In a known circuit for this converter a DC voltage-supplied half bridge is used as an inverter, which half bridge supplies power to a series combination of a resonant capacitor and the primary side of a transformer. The resonant capacitor together with the stray inductance of the transformer as well as further, also secondary-side inductances or capacitors forms a resonant arrangement. On the secondary side the load resonant converter has one or several secondary windings. In this manner a number of output DC voltages is supplied which are customarily filtered by at least one capacitive filter after rectification.

To regulate the output voltage of such a resonant converter it is known to change the drive of the inverter. The switches of the inverter are then controlled so that an AC voltage, in many cases a pulse width modulated voltage is generated having predefined parameters (for example frequency). By variation of the frequency of this voltage the magnitude of the output voltage can be regulated. The output voltage is then increased the closer the frequency comes to the resonant frequency of the resonant arrangement. For LLC converters, operation in the hypercritical area is customary i.e. the resonant arrangement is fed with a voltage whose frequency is higher than the resonant frequencies. During this operation the output voltage can be increased in that the frequency of the voltage is reduced. In known load resonant converters only one output voltage can be regulated directly. Further output voltages are coupled to the directly regulated output voltage via the ratio of the number of windings and are thus "co-regulated".

The type of converter dominating in consumer electronics is the flyback converter. This is a non-resonant converter. On the primary side the inverter usually needs to have only one switching element. On each of its outputs the flyback converter provides one-way rectification. One of the outputs can be regulated directly. If a second output voltage is necessary in the flyback converter, which output voltage is to be regulated directly, it is known to connect a further converter referred to as step-down converter or buck converter to one of the outputs of the flyback converter, which step-down converter is fed with the output voltage of the first flyback converter and supplies the second output voltage with a separate regulation. Such a circuit comprising two converters is very costly, however.

A further extension of the flyback converter topology which renders two regulated output voltages available is the so-termed double forward flyback converter. A corresponding topology is described, for example, in IEEE-PESC 1988, p. 142: "A Complete Study of the Double Forward—Flyback Converter" by J. Sebastian et al. As with the flyback topology used as a basis here it is not a resonant arrangement, but the primary-side AC voltage that is generated via a simple switch and is directly fed to the primary side of the transformer. On the secondary side there are two secondary units each formed by a secondary winding of the transformer and a one-way rectifier element (diode). The secondary voltages supplied by them are capacitively filtered by one secondary unit and inductively by the other. In this way it is possible to regulate an (inductively filtered) output voltage via the duty cycle of the pulse width modulated voltage and the other (capacitively filtered) output voltage via the frequency of the pulse width modulated voltage. But this "hard switching" topology gives rise to considerable switching losses.

In modern consumer electronics appliances it is more and more often necessary to produce a plurality of supply voltages because there are outputs with a lower power consumption and outputs with a higher power consumption It is an object of the invention to provide a resonant converter, a regulating method and a switched-mode power supply on at least two outputs of which, which outputs are arranged for delivering powers of different magnitudes, predefined voltages can be delivered.

This object is achieved by a resonant converter as claimed in claim 1, a regulating method as claimed in claim 10 and a switched-mode power supply as claimed in claim 11. Dependent claims relate to advantageous embodiments of the invention.

According to the invention a resonant topology is proposed i.e. a resonant arrangement is supplied with power by an inverter which comprises a series capacitor and the primary side of a transformer. Further, secondary-side elements may also form part of the resonant arrangement. In such a resonant topology the secondary voltages can be regulated via the frequency of the primary-side AC voltage. Via hypercritical operation there may be achieved with such a resonant converter that the resonant arrangement acts as an inductive load at the source, so that switching without losses (zero voltage switching) is possible.

According to the invention two types of secondary units are provided which have each at least one secondary winding of the transformer and at least one rectifier element. A first secondary unit (a first type of secondary units, respectively) and a second secondary unit (a second type of secondary units, respectively) are then oppositely oriented. The orientation is understood to mean the winding orientation in connection with the circuitry with the rectifier element. For example, two secondary units of opposite types can be distinguished in that the winding orientation on the shared transformer core is opposite with otherwise the same wiring. It is also possible in case of the same winding orientation of two secondary windings to distinguish the secondary unit of the first and the second type by respectively reversed wiring. Wiring is understood to mean the connection of the rectifier element which is preferably a one-way rectifier element, for example, a diode incorporated in only one branch.

As a result of the distinction between the two oppositely oriented types of secondary units, the two secondary units behave differently after being excited. During operation with an AC voltage the secondary units of the first and second type are successively supplied with power. In the definition used here of the types of secondary units a current flows through the first-type secondary unit in essence during a negative voltage level difference on the primary side of the transformer. During the positive voltage level difference on the primary side of the transformer a current accordingly flows through the second-type secondary unit. As will be explained in detail hereinafter, it is possible to utilize this distinction while respective specific excitation, more or less power is supplied by the first-type or second-type secondary units.

Rectification by the rectifier element generates secondary voltages on the secondary units. They may be used directly as an output voltage—customarily after filtering (preferably capacitive filtering). Such an output for which a secondary unit by itself supplies the output, is referred to here as a "direct output". Another form of output referred to here as "stack output" provides that the output voltage is supplied by at least one first-type secondary unit and at least one second-type secondary unit which are connected in series. According to the invention the former output voltage is realized as a direct output by a first-type secondary unit, whereas the second output voltage is realized as a stack output by a first-type secondary unit and a second-type secondary unit. The first output (direct output) is arranged for producing a lower power level and the second output (stack output) for producing a higher power level.

It is then preferred that the ratio of the rated power on the stack output to the rated power on the direct output lies between 1.5:1 and 10:1 if no more than the two former outputs are available. The design should preferably be made so that in nominal operation the two half waves are not loaded very differently. With two outputs and a perfectly symmetrical design, theoretically a 3:1 ratio of the output rated power in favor of the stack output is ideal. Because of the symmetrical design the two half waves are then uniformly loaded so that there is a duty cycle of 50%. Depending on the requirements made to the converter it may be necessary that this converter is capable of permitting either of the two output powers to drop to zero at full power on the respective other output. If the converter has a plurality of outputs, for example, two direct outputs and one stack output, these three outputs may be designed such as regards their rated power that a substantially uniform load of the half waves is achieved.

For the secondary-side circuit of the resonant converter, various output configurations are possible. On the one hand, the first-type secondary unit, which is provided in the form of a direct output for the first output voltage, may be interconnected to the second-type secondary unit in the form of a stack output for the second output voltage. Since each of the two secondary units has only one one-way rectifier element (diode), the total circuit in this case manages with only two such line semiconductors, so that a highly cost-effective structure is possible.

Alternatively, it is possible for the direct output for the first output voltage to be formed by a secondary unit (first-type) and the stack output for the second output voltage by two further secondary units (one first-type secondary unit and one second-type secondary unit). In this case three output rectifiers are necessary. It may then be provided that the direct output is completely electrically isolated from the stack output.

According to a further embodiment of the invention a regulating device is provided for regulating both the first and the second output voltage to a respective set value. For example, the desired output voltage can also be delivered with disturbing magnitudes such as a variable load etc. Such a regulating device takes up respective measured quantities from the resonant converter. In accordance with the regulation method according to the invention the regulating device drives the inverter. The inverter produces a switched AC voltage, preferably a pulse width modulated voltage of usually constant amplitude. To regulate the two output voltages, preferably two correcting variables defining the waveform of the pulse width modulated voltage are used, for example, switching frequency and duty cycle.

Preferably a modulator is used which drives the inverter on the basis of predefined values of the regulating device, in that a pulse signal for driving the switch of the inverter is predefined. Especially with small powers a half bridge is preferred as an inverter for reasons of cost, with which half bridge voltage pulses are generated from an input DC voltage in that two switches mutually switch. Also the use of a full bridge is conceivable.

The idea of regulating device here refers to a functional unit. This functional unit may be realized as an integrated or discrete analog or digital circuit. The regulation, however, may also be completely implemented as a digital control algorithm run on a micro- or signal processor, so that the regulating unit does not of necessity form a separate physical unit of a resonant converter.

A resonant converter according to the invention can produce two individually regulatory output voltages. In many cases, however, consumer electronic appliances need to have a larger number of for example 10 output voltages. If more than two output voltages are necessary for an application, they are divided into two groups where the voltages of each group can be regulated separately from the voltages of the respective other group. The formation of these groups is effected such that secondary units of the first type provide the output voltages of the first group in the form of direct outputs, whereas the second group of output voltages contains such voltages that are fed by secondary units of both the first and second type (stack outputs). Alternatively, second-type secondary units can also supply further output voltages of the second group as direct outputs.

According to a further embodiment of the invention there is provided that the regulating device processes measured values of the first and second output voltage. These two output voltages of which the first one is delivered to a direct output and the second one to a stack output, are measured continuously and the measuring results are applied to the regulating device where they are compared to respective set values.

The regulation of the output voltages irrespective of each other is possible by the utilization of the behavior of the first and second-type secondary units which is different depending on the excitation. When excited by a pulse width modulated voltage, the overall height of the output voltages can be regulated by suitably predefining the frequency (utilization of the increase of resonance). By predefining the duty cycle, the secondary voltages on the secondary units of opposite types can be mutually increased or reduced.

When the first and second output voltages are directly measured and respective regulation differences are formed, a regulation may be effected in that a preset value for the frequency of the switched AC voltage generated by the inverter is calculated from the regulation difference on the output voltage on the stack output. A preset value for the duty cycle of the switched AC voltage is calculated from the regulation difference of the output voltage on the direct output. The calculation of predefined values for frequency and duty cycle from the respective regulation differences is preferably made by known one-dimensional regulators, for example, I, PI, or PID regulators.

In an alternative embodiment the second output voltage produced on the stack output is not measured and regulated directly, but the respective output voltages of the secondary units which feed the stack output are measured and regulated individually. In this case the output voltage on the stack output which in a series combination corresponds to the sum of the individual output voltages on the secondary units is regulated indirectly. This configuration is particularly advantageous when further outputs are needed. Outputs which are fed by first-type secondary units then form a first group and outputs which are fed by second-type secondary units then form a second group. The outputs of the two groups are then coherently regulated within the group but may also be regulated independently of the other group.

These and other aspects of the invention are apparent from and will be elucidated with reference to the embodiments described hereinafter.

Figure 1:
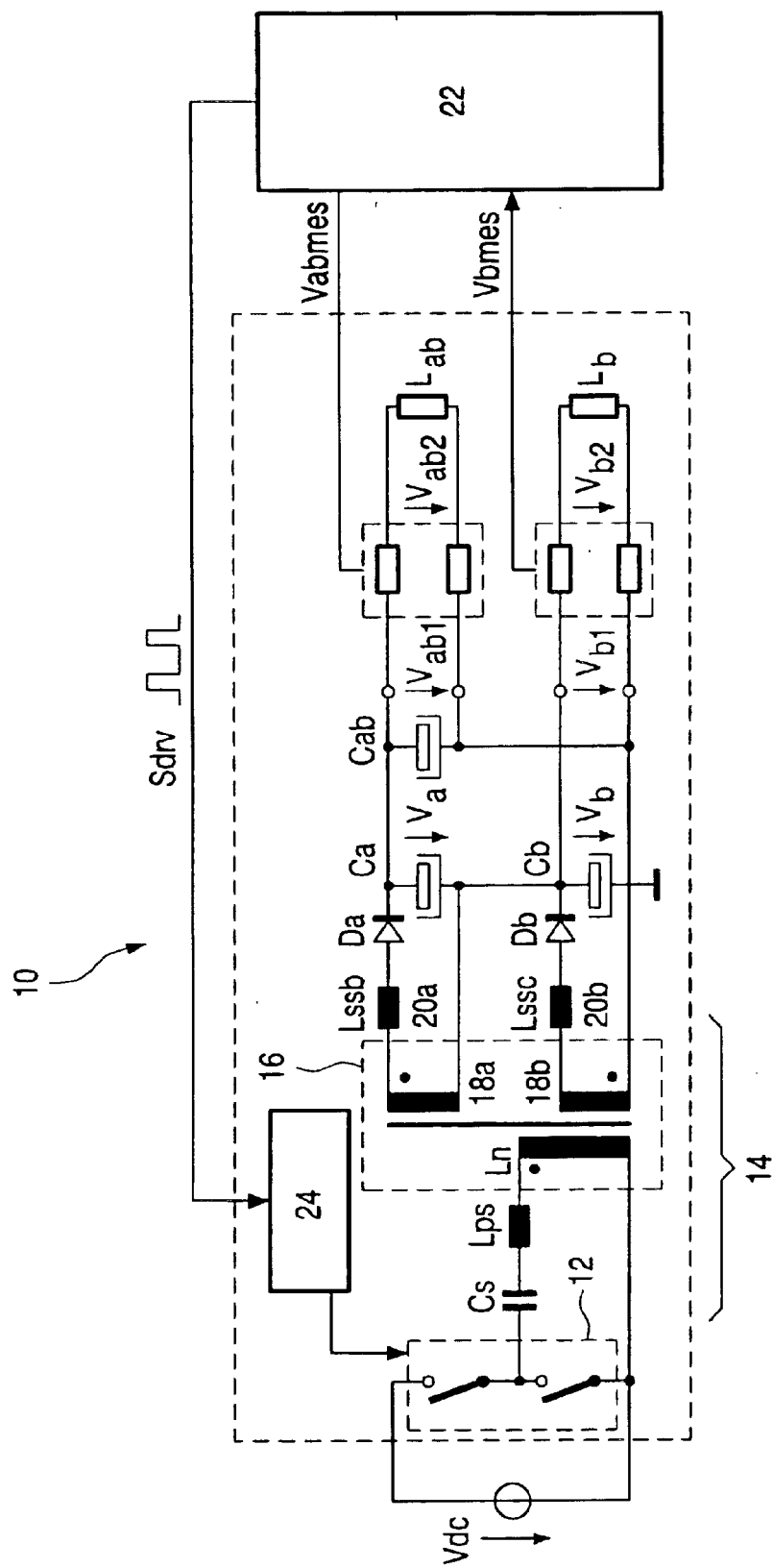
FIG. 1 shows a circuit diagram of a first embodiment of a resonant converter.

FIG. 1 shows a circuit diagram of a first embodiment of a resonant converter 10. The resonant converter 10 includes an inverter 12 arranged as an asymmetrically switching half bridge, which feeds a resonant arrangement 14 which comprises a series capacitor $C_s$ and the primary side of a transformer 16. FIG. 1 represents here a primary-side series inductance Lps. This inductance combines the primary-side stray inductance of the transformer and a possible external series inductance. The main inductance of the transformer is referred to as Lh. The inductances Lps and Lh together with the capacitor Cs form a series resonant circuit. In a simplified manner the circuit with resonant capacitor $C_s$ and the primary side of the transformer 16 is referred to here as resonant arrangement 14. In practice it may obviously not be overlooked that, additionally, reactive elements of the secondary circuit are activated on the primary side via the transformer 16 and also may decisively influence particularly the resonant behavior of the resonant arrangement 14.

The resonant converter 10 includes two secondary units 20a, 20b. Each one of the secondary units has a secondary winding 18a, 18b and a diode Da, Db. In addition, series inductances Lssa and Lssb are active. The secondary voltages Va, Vb present on the output of the secondary units 20a, 20b are smoothed by filter capacitors Ca, Cb.

The resonant converter 10 produces the two output voltages Vab1 and Vb1 on two outputs. A load Lab, Lb is connected to the outputs of the converter 10 via terminals (for example, plugs, lines etc.) featured by transition impedances.

The two outputs of the converter 10 are connected to the two secondary units 20a, 20b each in a different manner. The output voltage Vb1 drops at a direct output. Here the secondary voltage Vb on the secondary unit 20b is directly the output voltage of the converter 10.

The output of the converter 10 at which the output voltage Vab1 drops, on the other hand, is arranged as a stack output of the secondary units 20a, 20b. The secondary units 20a, 20b are then connected in series, so that the output voltage Vab1 corresponds to the sum of the secondary voltages Va and Vb. The output voltage Vab1 is optionally filtered by an additional filter capacitor Cab.

The output voltage Vab1 on the stack output of the converter 10 is provided for higher powers, the voltage Vb1 on the direct output for lower powers. In the example shown, there is a 3:1 ratio of the rated power on the stack output to the rated power on the direct output. For this purpose the secondary windings are arranged symmetrically, which means with the same number of windings.

In FIG. 1 the secondary units 20a, 20b are distinguished in that the secondary windings 18a, 18b have different winding orientations on the common core of the transformer 16. This is featured in customary fashion by a dot. Furthermore, the secondary units 20a, 20b are identical i.e. the respective secondary winding 20a, 20b has the same orientation as the respective rectifier diode Da, Db.

The lower secondary unit 20b will hereinafter be referred to as first-type secondary unit. The upper secondary unit 20a in FIG. 1 will be referred to as second-type secondary unit. As observed, the difference between the first-type and second-type secondary units with the same wiring is the opposite orientation of windings. The same effect may also be obtained in that the wiring i.e. the diode Da or Db is connected to the other end of the winding or its poling is exchanged (not shown) when the winding orientation is the same. The effect obtained from it is that with the first-type secondary unit 20b a current flows through the diode Db in essence during the negative voltage deviation on the primary side of the transformer 16, whereas this is the case during the positive voltage deviation in the second-type secondary unit 20a. This is achieved in that in each secondary unit 20a, 20b the voltage on the respective secondary winding 18a, 18b is unidirectionally rectified, whereas in the first-type secondary unit 20b a current can flow across the diode Db only in case of a negative voltage deviation when the voltage occurring on the secondary winding 18b is more positive than the voltage Vb on the filter capacitor Cb, whereas the diode Db blocks during the positive voltage deviation. The reverse is true for the second-type secondary unit.

Inverter 12 produces an AC voltage which is generated by the alternating switching of its two controlled switches, for example, realized by FETs. The inverter 12 is then driven in a way that it applies a pulse width modulated switched AC voltage to the resonant arrangement 14.

The switches of the inverter 12 are controlled by a half-bridge driver 24. The latter is driven by a regulating device 22 for regulating the output voltages Vab1, Vb1. The output voltages Vab1, Vb1 are measured. The output voltage can be measured at the respective output terminals. Alternatively, the voltages Vab2, Vb2 can be detected at the load. More particularly for higher currents this is considerably more accurate.

The results of the measurements of the voltages Vab1, Vb1 are applied to the regulating device 22 as measuring signals Vabmes, Vbmes. The regulating device 22 compares the measured voltage signals with set values (not shown) and drives the inverter 12 so that the output voltages Va, Vb are regulated to the desired set values.

Figure 3A:
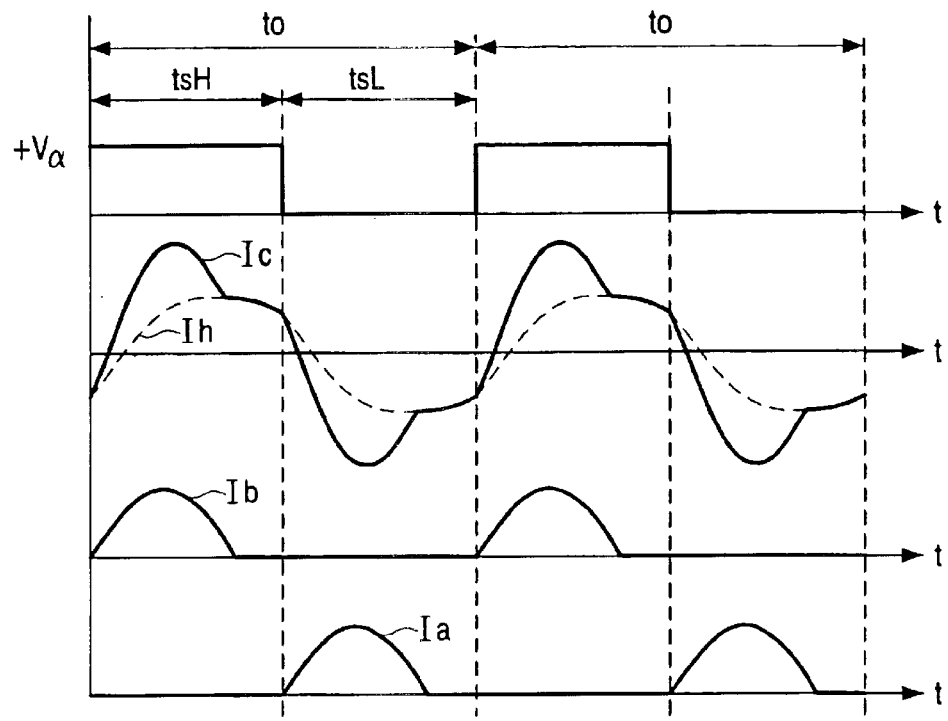
FIG. 3a shows a diagram representing the waveform of currents and voltages of the circuit shown in FIG. 1 under idealized assumptions.

The inverter 12 is then driven by the regulating device 22 so that it generates the pulse width modulated voltage. The waveform of such a pulse width modulated voltage is shown at the top in FIG. 3a. Within a time interval of length t0 first the upper switch of the half bridge is closed so that a positive voltage pulse having amplitude +Vdc arises. This pulse has a duration tsH. Subsequently, the upper switch is opened and the lower switch is closed so that the zero voltage is present for a duration tsL. With a constant amplitude Vdc, predefined by the respective DC voltage source Vdc in FIG. 1, the waveform of the pulse width modulated voltage is determined by the parameters switching frequency f with f=1/t0 and duty cycle δ with δ=tsH/t0. Alternatively, the waveform is also completely determined by predefining the times tsH and tsL. In the example of FIG. 3a the duty cycle is 50%.

The waveform of a pulse width modulated voltage shown in FIG. 3a is obviously idealized. Actually, during the change-over there are dead times to avoid short-circuits, in which dead times none of the switches is closed. In addition, the pulse edges cannot instantaneously rise in practice, but there are waveforms with finite rise times so that the voltage pulses adopt approximately a trapezoidal shape.

With the resonant converter 10 shown in FIG. 1 it is possible to regulate the two output voltages Vab1, Vb1 separately. The two voltages Vab1, Vb1 are then dependent on the secondary voltages Va, Vb of the opposite-type secondary units 20a, 20b. As a result, as will be explained hereinafter, such a drive can be predefined by suitably predefining the parameters of the pulse width modulated voltage (f, δ or tsH, tsL, respectively), so that the output voltages Vab1, Vb1 can be regulated to a set value independently of each other.

As already observed before, the converter 10 has a resonant topology with a series capacitor $C_s$. This capacitor has a load-dependent resonant frequency whose value in unloaded state is substantially known at any rate on the basis of the components used. The operation of the circuit takes place at switching frequencies f which are clearly above the respective resonant frequencies. In this range of operation there is already a certain resonant voltage increase. By exciting the resonant arrangement 14 with a lower frequency, which then comes closer to the resonant frequency, the resonant increase becomes stronger so that the secondary voltages Va, Vb rise. Based on the two opposite types of secondary units 20a, 20b it is possible in this respect to increase or reduce either of the secondary voltages Va, Vb relative to the other by additionally predefining the duty cycle δ. This will be further explained with reference to FIGS. 3a–3c.

Figure 3B:
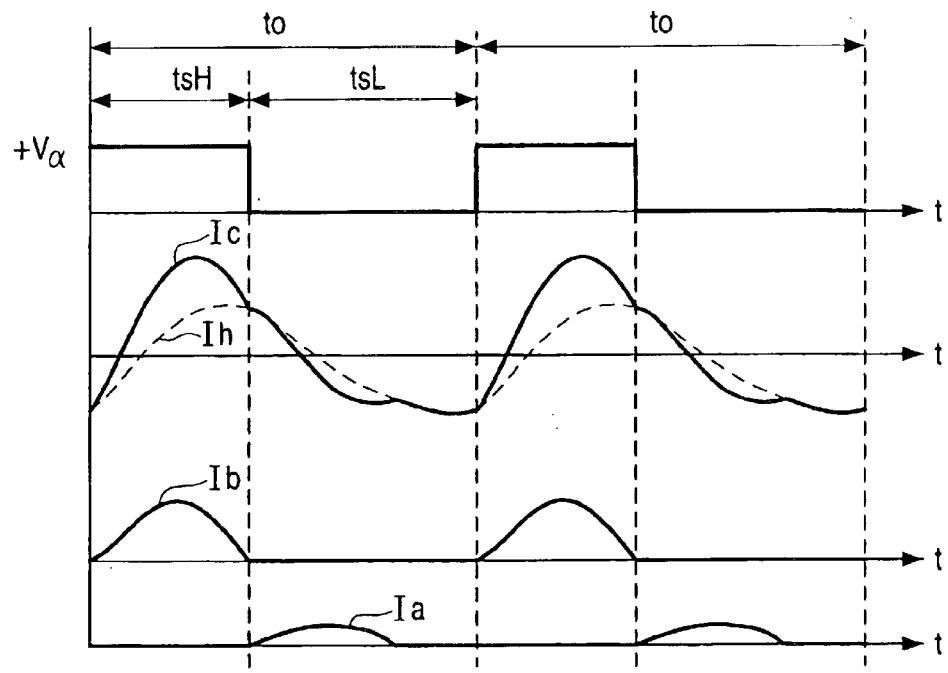
FIG. 3b shows a diagram corresponding to that of FIG. 3a with a lower duty cycle and a higher frequency.
Figure 3C:
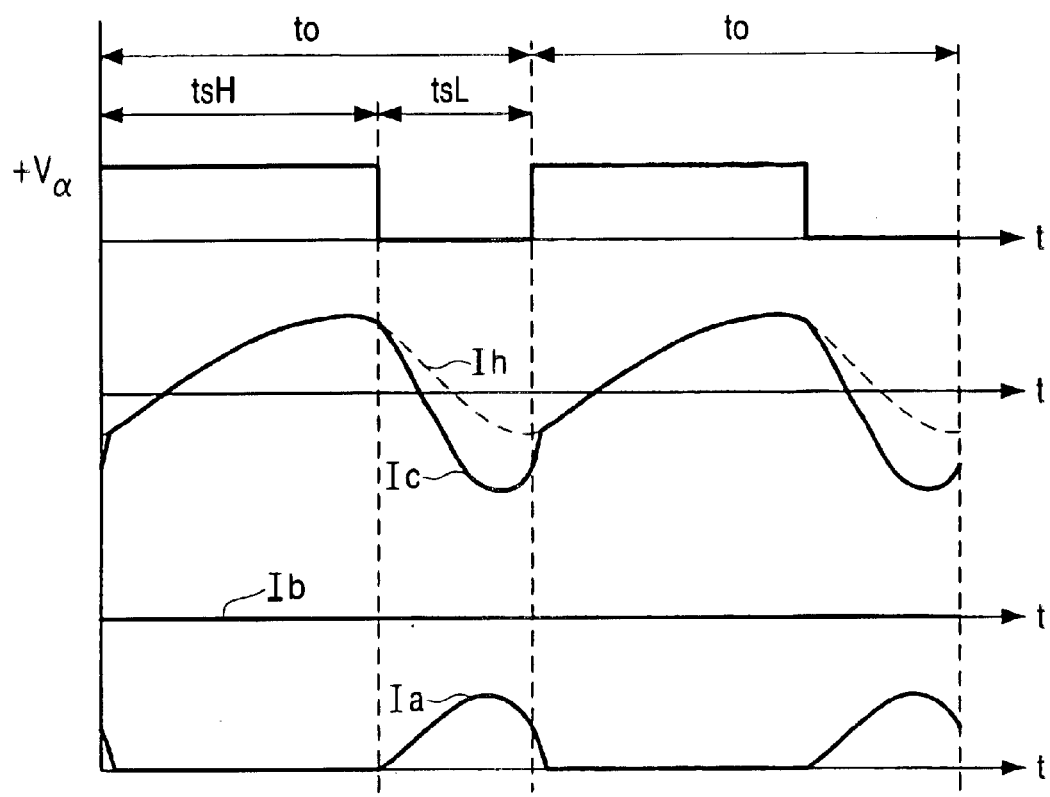
FIG. 3c shows a diagram corresponding to those of FIGS. 3a and 3b with a higher duty cycle and further increased frequency.

The FIGS. 3a, 3b, 3c show how a regulation of the secondary voltages Va and Vb is made possible by adaptation of frequency f or the period duration t0=1/f and of the duty cycle δ. For two periods of time t0 are shown the respective waveforms of the output voltage of the inverter 12 (excitation voltage on the resonant arrangement 14), of the current Ic by the capacitor $C_s$, of the magnetizing current Ih by the main inductance Lh of the transformer 16, of the current Ia delivered by the secondary winding 18a and of the current Ib delivered by the secondary winding 18b. The waveforms shown in FIGS. 3a, 3b, 3c should only be used for explaining the principle according to which the two outputs are regulated independently of each other. The waveforms shown depict the respective magnitudes under the assumption that all winding ratios equal one and the magnitudes of the two secondary units 20a, 20b are identical i.e. Va=Vb. Furthermore, identical output-side series inductances are assumed.

FIG. 3 shows the state of operation in which the frequency f0=1/t0 is set to 1.47 times fr, where fr is the resonant frequency of the unloaded converter 10 and is approximately $$fr = \frac{1}{2\pi}\sqrt{\frac{1}{C[Lps + Lh]}}$$

where C is the capacitance of the capacitor $C_s$, Lps the value of the primary-side series inductance and Lh the value of the main inductance of the transformer 16. The above equation only holds for the case of the output-side unloaded converter. In case of an output-side load there is a shift that depends on the output-side stray inductances and generally also on the load. To determine the exact resonant frequency for the loaded converter 10 is relatively costly. Therefore, only the resonant frequency fr mentioned above is used as a reference magnitude for the frequency.

The duty cycle in operation shown in FIG. 3a is selected to be 50%. In this state of operation current patterns of Ia and Ib with (substantially) identical half waves are generated during the time spaces tsH or tsL, respectively. With the state of operation shown in FIG. 3b, the frequency f0=1/t0 is increased by 1.53 times fr. The duty cycle is reduced to 40%. As against the state of operation shown in FIG. 3a the pattern of the current Ib has remained substantially the same. The current waveform Ia now has half waves with reduced amplitude, so that the power transported over the secondary winding 18a to the output of the second secondary unit 20a is reduced. FIG. 3c shows an operation with a frequency f0=1/t0 equal to 1.55 times fr and a duty cycle of 65%. In this state of operation the current Ib is reduced substantially to zero and the amplitude of the half waves of Ia are increased as against FIG. 3b, so that in this state of operation the secondary winding 18b does not transport any power to the output of the first secondary unit 20b, but the secondary winding 18a transports a power increased relative to FIG. 4b from the secondary winding 18a to the output of the second secondary unit 20a.

The states of operation as shown in FIGS. 3a–3c shown by way of example clarify that a highly variable adaptation to different loads of the various converter outputs is possible with the converter circuit shown in FIG. 1. With such a converter small tolerances of the output voltages can be achieved especially with small output voltages and large output currents as they are needed by modern microprocessors.

Figure 2:
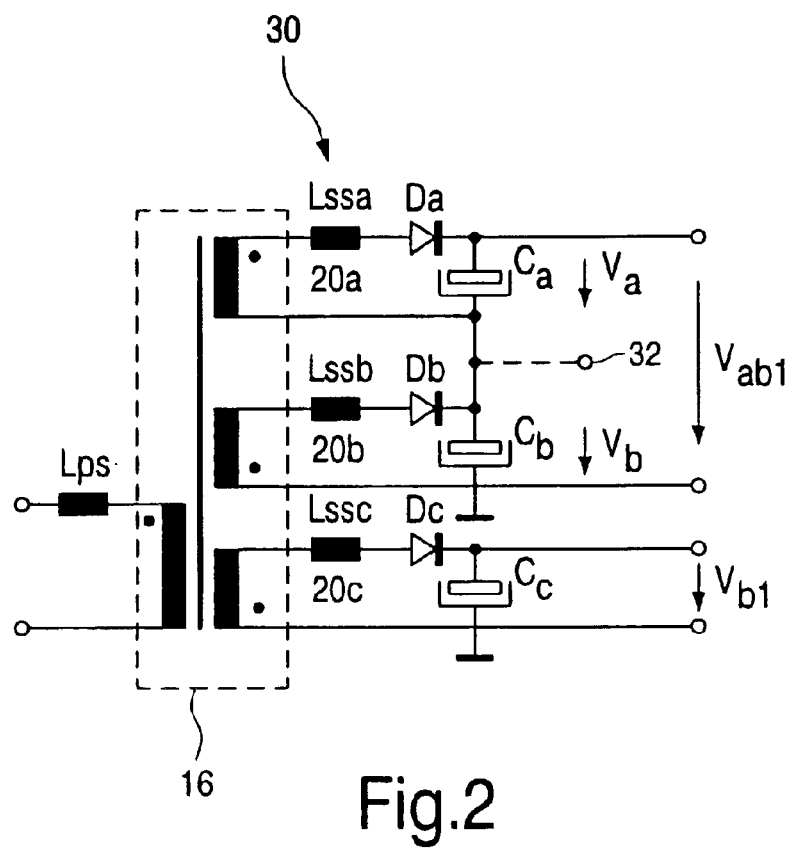
FIG. 2 shows a circuit diagram of part of the second embodiment of a resonant converter.

FIG. 2 shows part of a second embodiment of a resonant converter 30. Only the transformer 16 and its secondary-side wiring are shown here. The other elements are identical with the circuit 10 shown in FIG. 1 and are therefore not shown separately.

Contrary to the converter 10 according to the first embodiment, the converter 30 includes three secondary units 20a, 20b, 20c. The secondary units 20b and 20c are first-type secondary units, the secondary unit 20a is a second-type secondary unit. This can be detected from FIG. 2 with the aid of the respective winding orientation (featured by a dot) together with the further identical wiring.

As with the first embodiment, also with the second embodiment the first output voltage Vb1 is delivered on a direct output, which is provided here by the first-type secondary unit 20c. The first output voltage Vb1 is filtered by the filter capacitor $C_c$. The second output voltage Vab1 is delivered on a stack output for which the secondary units 20a, 20b each with the filter capacitor Ca, Cb are connected in series, so that the output voltage Vab1 corresponds to the sum of the secondary voltages Va, Vb.

The second embodiment of a converter 30 distinguishes itself from the first embodiment in that the direct output is fed by a separate secondary unit 20c which does not form part of the secondary units 20a, 20b feeding the stack output. The direct output may in this case even be electrically isolated from the stack output. However, three diodes Da, Db, Dc are necessary for two outputs Vab1, Vb1 of the second embodiment, whereas only two diodes are necessary for two outputs in the first embodiment.

The first and second embodiments shown in FIGS. 1 and 2 each show a converter with only two output voltages which can be regulated independently of each other. In practice, however, converters are often needed that are able to generate a plurality of output voltages, for example ten or more. This is possible with the converters 10, 30 respectively of FIGS. 1 and 2 in that further secondary units each consisting of a secondary winding and a rectifier element are added. For this purpose, further secondary windings are deposited on the core of the transformer 16 and arranged as secondary units. The output voltages are subdivided into two groups in which the output voltages of the first group are generated on direct outputs of the first-type secondary elements and the output voltages of the second group on stack outputs of secondary elements of the first and second type. The two groups of output voltages can then be regulated separate from the respective other group. Within the group the output voltages, however, are linked up via the number of windings ratio of the respective secondary windings. Therefore, only one voltage of the first and one of the second group is taken into account for the regulation. The other voltages are then "co-regulated".

The various types of wiring of the secondary units as shown in FIGS. 1 and 2 may also be combined.

An example for a converter having three output voltages is shown in FIG. 2 by the dashed-line output terminal 32 from which the voltage Va can be tapped. The converter arranged like this renders three output voltages Va, Vb1, Vab1 available of which the output voltage Vb1 is tapped from a direct output of the first-type secondary unit 20c, the voltage Va from the direct output of the second-type secondary unit 20a and the voltage Vab1 from a stack output of the secondary units 20a, 20b of the opposite type.

Figure 2A:
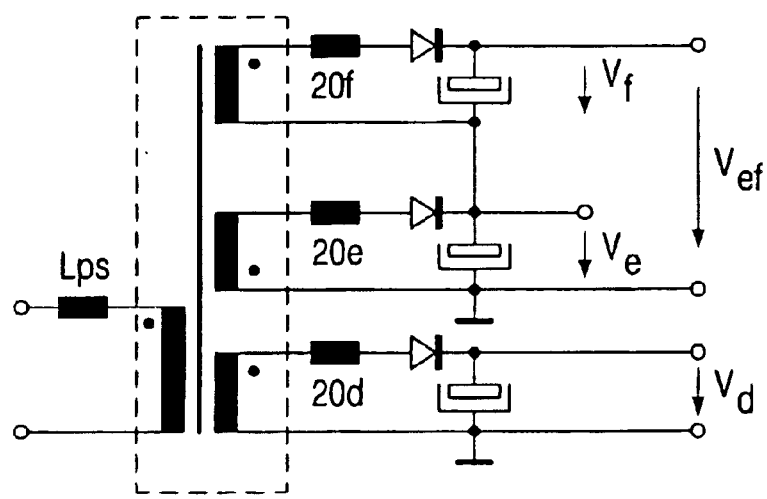
FIG. 2a shows a circuit diagram of part of a third embodiment of a resonant converter.

FIG. 2a shows a further alternative embodiment of a converter. The circuit largely corresponds to that of FIG. 2 and is therefore not explained in more detail.

On the secondary side of the converter shown in FIG. 2a it comprises secondary-side secondary units 20d, 20e and 20f of which the secondary unit 20e is a first-type secondary unit and the secondary units 20d, 20f are second-type secondary units. The second-type secondary unit 20d produces the voltage Vd in the form of a direct output. The secondary units 20e, 20f produce the output voltages Vf, Ve in the form of direct outputs and are additionally connected in series, so that they produce the output voltage Vef in the form of a stack output. Thus the converter shown in FIG. 2a distinguishes itself from the converter 30 shown in FIG. 2 only by the orientation of the secondary unit 20d represented below.

An application is represented as an example of the embodiment shown in FIG. 2a. A set voltage of 12 volts and about ¾ of the total power is necessary at an output for supplying power to an LCD monitor for the panel. Two further voltages of 3.3 and 5 volts and having about the same power are necessary for the purpose of signal processing. The power supply of the LCD monitor can be realized with the circuit shown in FIG. 2a. The output Vef is then arranged so that the set voltage is 12 volts necessary for supplying the power to the panel. The output voltage Ve is designed to be, for example, 3.3 and the output voltage Vd 5 volts.

Assuming a distribution of the set power Pef=⅔Ptot and Pe=Pd=⅙Ptot, the total load of the half wave associated with the first-type secondary unit 20e is Phwb=½*Pef+Pe= ½Ptot, and the load of the half wave associated with the second-type secondary units 20d, 20f is Phwa=½*Pef+Pd= ½Ptot, i.e. there is a uniform load.

This is an example of how the distribution of the outputs, starting from the requirements, can be selected such that there is as uniform a load as possible of the respective half waves. In a concrete application it should additionally be noted that still further requirements additionally show up for the selection of the output configuration and the direct-control outputs for the criterion of the symmetrical rated-power load in practice. They comprise the adaptation of the numbers of windings of the individual windings to the respective voltages (not steplessly controllable), the resulting (possibly asymmetrical) output inductances or output inductances to be dimensioned and the dealing with element tolerances as well as the allowable output voltage tolerances. The expert will therefore have to checked in each single case which output configuration satisfies the respective requirements.

Figure 4:
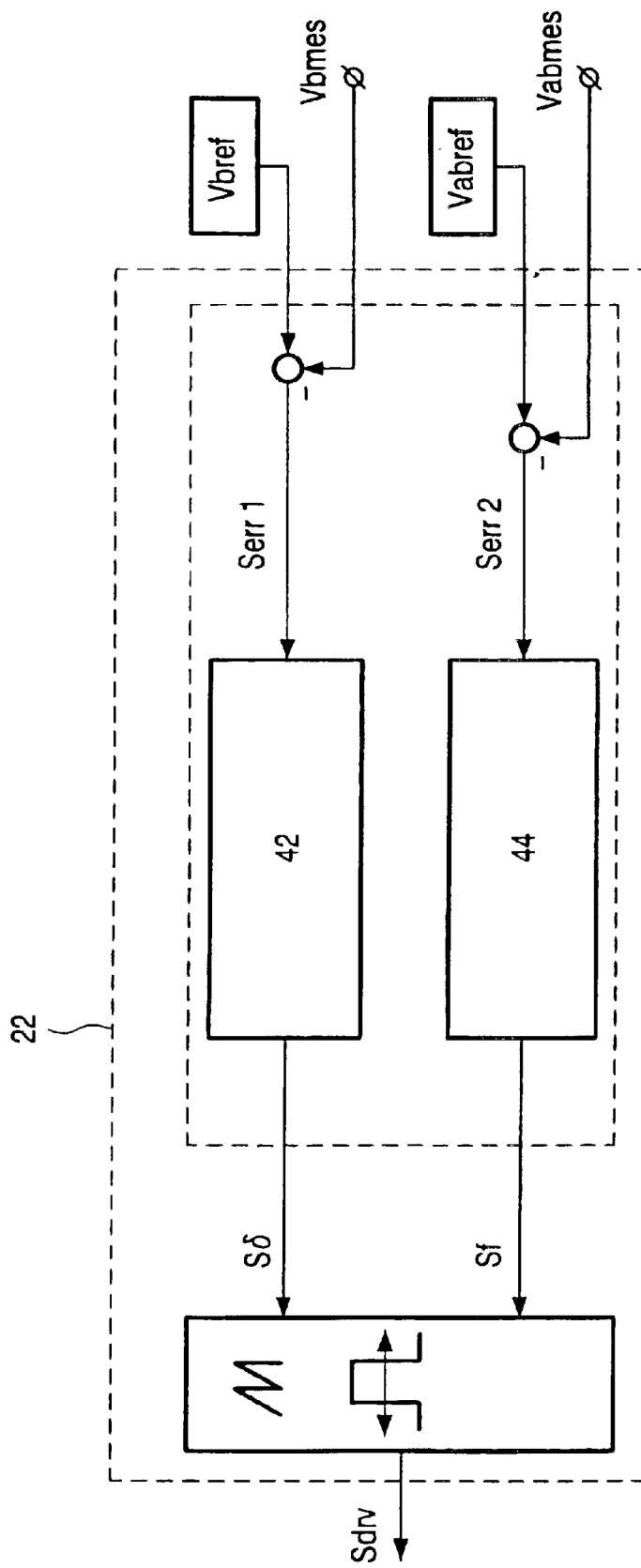
FIG. 4 shows a block diagram of an embodiment of a regulating device.

Hereinafter, the regulating device 22 will be discussed. A block diagram representing the structure of a first embodiment of this regulating device is shown in FIG. 4.

At the inputs the regulating device 22 takes in two voltage measuring signals Vabmes and Vbmes. The measuring signal Vabmes is a voltage measuring signal of the output voltage Vab1 of the stack output, the measuring signal Vbmes is the measuring signal for the output voltage Vb1 of the direct output. The measuring signals are compared with set values Vbref, Vabref and regulating differences Serr1, Serr2 are formed.

Figure 6:
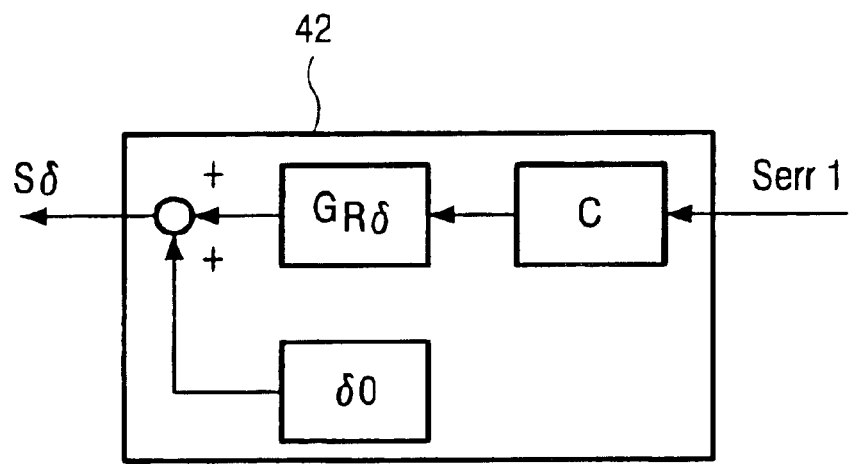
FIG. 6 shows a block diagram of a duty cycle regulator.

The regulating difference Serr1 of the output voltage at the direct output is applied to a duty cycle regulator 42 which applies regulating difference Serr2 of the output voltage at the stack output to a frequency regulator 44. The duty cycle regulator 42 produces a predefined value Sδ for the duty cycle, which predefined value is based on the regulating difference Serr1. The structure of the regulator 42 is shown in FIG. 6. Starting from a basic predefined value δ0 of, for example, 50%, a one-dimensional regulator GRδ (for example, a one-dimensional I, PI or PID regulator) corrects the predefined value Sδ for the duty cycle depending on error Serr1, while in response to the integral part of GRδ also a constant regulation difference is corrected and the predefined value δ0 this has no influence on the accuracy of regulation.

The error signal Serr1 is multiplied by a structure constant c inside the regulator 42. Here c=+1 if Vbmes is the measuring signal of an output produced by a first-type secondary unit 20b. If Vbmes is the measuring signal of an output fed by a second-type secondary unit 20a, the constant c assumes the value −1. This can be explained in conjunction with the explanations given above with reference to FIGS. 3a–3c in which a larger or smaller power was produced via the secondary units of opposite types depending on the larger or smaller duty cycle.

Figure 5:
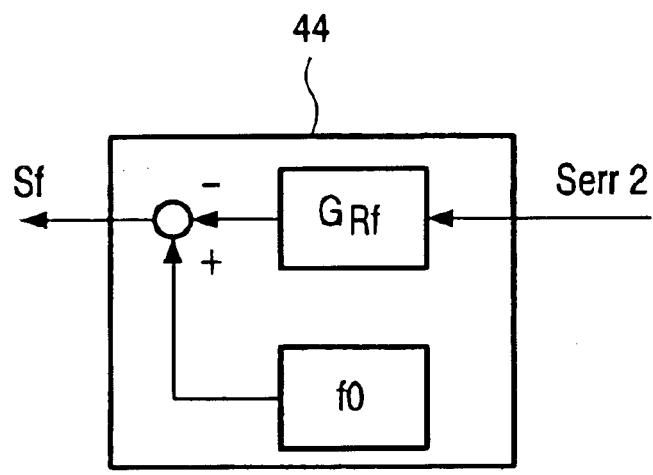
FIG. 5 shows a block diagram of a frequency regulator.

The regulation difference Serr2 of the stack output is fed to the frequency regulator 44. Its structure is shown in FIG. 5. An I, PI or PID regulator GRf here predetermines a deviation from the basic predefined value f0.

The predefined values Sδ, Sf are applied to a modulator M which generates therefrom a pulse signal Sdrv. The pulse signal Sdrv is used in FIG. 1 to control the driver 24 which drives the inverter 12. The modulator M then generates such a pulse signal Sdrv that the predefined values Sδ for the duty cycle and Sf for the frequency predefine the respective magnitudes in the switched AC voltage generated by the inverter. The following example will explain the way of operation of the regulation.

If, for example in FIG. 1, the output voltage Vab1 on the stack output drops below its set value, so that the difference Vabref-Vabmes has a positive value, this positive value is applied as Serr2 to the frequency regulator 44. This (FIG. 5) leads to a reduction of the predefined value Sf for the frequency. The respectively driven modulator M provides via the signal Sdrv that the inverter 12 generates a pulse width modulated voltage of lower frequency. The frequency is closer to the resonance of the resonant arrangement 14, so that both secondary voltages Va, Vb are increased. Since the output voltage Vab1 corresponds to the sum of the voltages Va, Vb, this voltage rises accordingly, so that the regulation difference relating thereto is settled.

The reduction of the frequency, however, causes the output voltage Vb1 to rise, so that this leads to a negative regulation difference Serr1. This leads (in the present example the structure constant C has the value +1) to an increase of the duty cycle, so that (see FIG. 3b) the output voltage Vb1 drops and both regulating differences Serr1, Serr2 are zero again.

In an alternative embodiment of the regulation (not shown) the voltage on the stack output is not measured and regulated directly, but each time two secondary voltages of two opposite types of secondary units, for example, the secondary voltages Va, Vb in FIG. 1 are measured and regulated, so that the output voltage Vab1 on the stack output is "co-regulated" as the sum of the two voltages. Regulating the secondary voltages Va, Vb separately is possible by respectively predefining frequency and duty cycle as shown in FIGS. 3a–3c. In the respective regulating device regulating differences are formed for the two secondary voltages Va, Vb, a predefined value for the frequency being determined from the sum of these regulating differences by a one-dimensional regulator, and a predefined value for the duty cycle being determined from the difference between these regulating differences by a further one-dimensional regulator.

A switched-mode power supply is constructed with the resonant converter shown in that one of the switched-mode power supply input circuits known to the expert (for example a mains rectifier and smoothing capacitor, as required) generates a non-stabilized intermediate circuit DC voltage from the mains voltage. The resonant converters 10, 30 are supplied with this intermediate circuit DC voltage Vdc.

The invention may be summarized in this respect in that a resonant converter, a regulation method for a resonant converter and a switched-mode power supply with a resonant converter are represented. The converter comprises an inverter for generating an AC voltage which is supplied to a resonant arrangement including a capacitor and a transformer. The circuit includes two types of secondary units each comprising a secondary winding of the transformer and at least one rectifier element. First-type and second-type secondary units are then distinguished by opposite orientation, for example, opposite winding orientation or opposite wiring orientation. On the output side are produced at least two output voltages, a first output voltage of which being supplied as a direct output by a first-type secondary unit and a second output voltage as a "stack output" by a first-type secondary unit and a second-type secondary unit, preferably as a series combination of these secondary units. The stack output is then arranged for delivering a larger power, the direct output for smaller output powers. The two output voltages can be regulated separately by a regulating device, the regulating device predefining the driving of the inverter, preferably for delivering a pulse width modulated voltage. For example, by suitably selecting frequency and duty cycle of the pulse width modulated voltage, the voltages can be regulated to set values independently of each other.

What is claimed is:

1. A resonant converter comprising
   an inverter for generating an AC voltage,
   and a resonant arrangement fed with the AC voltage and comprising at least one capacitor and at least one transformer having a primary winding, a first secondary winding for forming a first-type secondary unit, and a second secondary winding for forming a second-type secondary unit, said first secondary winding and said second secondary winding being associated with said primary winding,
   said first-type secondary unit and said second-type secondary unit being distinguished by opposite orientations,
   and at least two output voltages being supplied of which a first output voltage is supplied by said first-type secondary unit, and
   a second output voltage being supplied by said first-type secondary unit and said second-type secondary unit, and
   a regulating device which is arranged so that a respective regulating difference is formed for the first and second output voltages,
   the regulating difference of the first output voltage being used for calculating a predefined value for a duty cycle of the pulse width modulated voltage, and
   the regulating difference of the second output voltage being used for calculating a predefined value for a switching frequency of a pulse width modulated voltage fed to the resonant arrangement.

2. A resonant converter as claimed in claim 1, in which the regulating device is configured for regulating the two output voltages to a respective set value,
   the regulating device being arranged so that it predefines driving of the inverter.

3. A resonant converter as claimed in claim 2, in which the regulating device predefines the driving of the inverter so that said pulse width modulated voltage is produced for feeding the resonant arrangement.

4. A resonant converter as claimed in claim 3, in which the regulating device is arranged so that it predefines said switching frequency and said duty cycle of the pulse width modulated voltage.

5. A resonant converter as claimed in claim 2 in which the regulating device is arranged so that it processes measured values of the first and second output voltages.

6. A resonant converter as claimed in claim 2, in which
the regulating device is arranged so that it processes measured values of the first output voltage produced by the first-type secondary unit, and
measured values of the second output voltage produced by the second-type secondary unit.

7. A resonant converter as claimed in claim 1, in which
the first output voltage is supplied by the first-type secondary unit; and
the second output voltage is supplied by the first-type secondary unit combined in series with the second-type secondary unit.

8. A resonant converter as claimed in claim 1, in which
the first output voltage is supplied by the first-type secondary unit; and
the second output voltage is supplied by a second one of the first-type secondary unit combined in series with the second-type secondary unit.

9. A regulation method for a resonant converter, in which
the converter comprises an inverter for generating an AC voltage and a resonant arrangement fed with the AC voltage and comprising at least one capacitor and at least one transformer having a primary winding, a first secondary winding for forming a first-type secondary unit, and a second secondary winding for forming a second-type secondary unit, said first secondary winding and said second secondary winding being associated with said primary winding,
wherein said first-type secondary unit and said second-type secondary unit are distinguished by opposite orientations,
and at least two output voltages being supplied of which a first output voltage is supplied by said first-type secondary unit, and
a second output voltage being supplied by said first-type secondary unit and said second-type secondary unit,
in which driving of the inverter is predefined to regulate the first and second output voltages to respective set values, and
a regulating device which is arranged so that a respective regulating difference is formed for the first and second output voltages,
the regulating difference of the first output voltage being used for calculating a predefined value for a duty cycle of the pulse width modulated voltage, and
the regulating difference of the second output voltage being used for calculating a predefined value for a switching frequency of a pulse width modulated voltage fed to the resonant arrangement.

10. A switched-mode power supply comprising
a power supply input circuit for connection to an electricity power grid and for producing an intermediate circuit DC voltage, and
a resonant converter as claimed in claim 1 which is fed with the intermediate circuit DC voltage.

11. A converter comprising:
an inverter configured to generate an AC voltage in response to a signal;
a transformer configured to receive said AC voltage, said transformer having a primary winding, a first secondary winding for forming a first-type secondary unit which is configured to output a first output voltage, and a second secondary winding for forming a second-type secondary unit, said first secondary winding and said second secondary winding being associated with said primary winding,
wherein a second output voltage is provided by said first-type secondary unit and said second-type secondary unit; and
a regulating device configured to regulate said inverter using a first difference value of said first output voltage and a first predetermined value, and a second difference value of said second output voltage and a second predetermined value;
said first difference value being used for calculating a duty cycle of said signal, and said second difference value being used for calculating a frequency of said signal;
said first-type secondary unit and said second-type secondary unit being distinguished by opposite orientations.

12. A converter comprising:
an inverter configured to generate an AC voltage;
a transformer configured to receive said AC voltage, said transformer having a primary winding, a first secondary winding for forming a first-type secondary unit which is configured to output a first output voltage, and a second secondary winding for forming a second-type secondary unit, said first secondary winding and said second secondary winding being associated with said primary winding; and
a regulating device configured to regulate said inverter using a signal derived from a first difference value of said first output voltage and a first predetermined value, and a second difference value of said second output voltage and a second predetermined value;
said first difference value being used for calculating a duty cycle of said signal, and said second difference value being used for calculating a frequency of said signal;
wherein a second output voltage is provided by said first-type secondary unit and said second-type secondary unit.

13. The converter of claim 12, wherein said first-type secondary unit and said second-type secondary unit are distinguished by opposite orientation.

14. A method of regulating a converter comprising:
generating an AC voltage;
providing the AC voltage to a transformer having a primary winding, a first secondary winding for forming a first-type secondary unit, and a second secondary winding for forming a second-type secondary unit, wherein said first secondary winding and said second secondary winding are associated with said primary winding;
forming a first output voltage by said first-type secondary unit;
forming a second output voltage by said first-type secondary unit and said second-type secondary unit; and
regulating an inverter using a signal derived from a first difference value of said first output voltage and a first predetermined value, and a second difference value of said second output voltage and a second predetermined value;
said first difference value being used for calculating a duty cycle of said signal, and said second difference value being used for calculating a frequency of said signal.

15. The method of claim 14, wherein said first-type secondary unit and said second-type secondary unit are distinguished by opposite orientation.

* * * * *